(12) United States Patent
Lemaire et al.

(10) Patent No.: US 6,966,958 B2
(45) Date of Patent: Nov. 22, 2005

(54) PRECISION ALIGNMENT OF TIRE BUILDING DRUM TO AUTOMATED TIRE BUILDING SYSTEM WORKING AXIS

(75) Inventors: Michel Lemaire, Habay-la-Neuve (BE); John Kolbjoern Roedseth, Bissen (LU); Francis Cornet, Habay-la-Vieille (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 340 days.

(21) Appl. No.: 09/960,078

(22) Filed: Sep. 21, 2001

(65) Prior Publication Data

US 2003/0056878 A1 Mar. 27, 2003

(51) Int. Cl.[7] ............................................. B29D 30/26
(52) U.S. Cl. ..................................... 156/111; 156/396
(58) Field of Search ........................ 156/111, 396, 123, 156/133; 29/429, 430; 414/749, 6, 584

(56) References Cited

U.S. PATENT DOCUMENTS

| | | | |
|---|---|---|---|
| 1,309,894 A | | 7/1919 | Kilborn |
| 1,333,150 A | | 3/1920 | Bartlett |
| 1,964,363 A | * | 6/1934 | Ostling et al. ............... 156/111 |
| 2,336,596 A | * | 12/1943 | Chouinard ................... 266/58 |
| 3,157,542 A | | 11/1964 | William |
| 3,268,095 A | | 8/1966 | Durbin |
| 3,355,339 A | * | 11/1967 | Hineline ..................... 156/112 |
| 3,389,032 A | * | 6/1968 | Black et al. ................. 156/111 |
| 3,654,828 A | | 4/1972 | Leblond et al. |

(Continued)

FOREIGN PATENT DOCUMENTS

EP 0414554 2/1991

(Continued)

OTHER PUBLICATIONS

U.S. Appl. No. 09/957,740, filed Sep. 21, 2001, Durand et al.

(Continued)

Primary Examiner—Geoffrey L. Knable
(74) Attorney, Agent, or Firm—Howard M. Cohn

(57) ABSTRACT

Method and apparatus for precision alignment of a moving tire building drum to an automated tire building system working axis, wherein the automated tire building system comprises one or more work stations with application drums aligned to the working axis, and the tire building drum is moved into and out of each work station, comprising: supporting the tire building drum on a rigid, two-sided drum support frame having flat skates with flat bearing rollers under one side, and V-skates with V-mounted bearing rollers under the other side; providing a rail system comprising first and second approximately parallel rails passing through the one or more work stations, wherein the first rail is substantially flat-topped, and the second rail is substantially inverted V-shaped on top; causing the one or more flat skates to ride on the first rail, and causing the one or more V-skates to ride on the second rail; and positioning the drum support frame, the flat skates, and the V-skates relative to the tire building drum and the first and second rails; and positioning the first and second rails relative to the working axis; such that when the flat skates ride on the first rail and the V-skates ride is on the second rail, the tire building drum is riding on the rail system and is precision aligned to the working axis. Exit ramps and funneling entry ramps are provided for exiting and re-entering the rail system. The tire building drum is moved by a vehicle having a flexible connection.

10 Claims, 7 Drawing Sheets

U.S. PATENT DOCUMENTS

| | | |
|---|---|---|
| 3,706,448 A | 12/1972 | Salter et al. |
| 3,721,354 A * | 3/1973 | Raynes et al. ............... 414/396 |
| 3,840,436 A | 10/1974 | Lorrek |
| 4,067,453 A | 1/1978 | Moller |
| 4,127,199 A | 11/1978 | Clethero |
| 4,314,864 A | 2/1982 | Leoffler et al. |
| 4,718,810 A * | 1/1988 | Hoehn et al. ............... 414/286 |
| 4,836,880 A | 6/1989 | Haas |
| 5,312,237 A | 5/1994 | Siegenthaler |
| 5,372,072 A | 12/1994 | Hamy |
| 5,411,626 A * | 5/1995 | Coretta et al. ............... 156/396 |
| 5,472,555 A | 12/1995 | Siegenthaler |
| 5,473,657 A | 12/1995 | McKenna |
| 5,551,619 A | 9/1996 | Narron |
| 6,052,970 A | 4/2000 | Fujimoto et al. |

FOREIGN PATENT DOCUMENTS

| | | |
|---|---|---|
| EP | 0555813 | 8/1993 |
| EP | 0666165 | 8/1995 |
| GB | 372043 | 5/1932 |
| JP | 2001-247037 A * | 9/2001 |

OTHER PUBLICATIONS

U.S. Appl. No. 09/957,785, filed Sep. 21, 2001, Zeh et al.

U.S. Appl. No. 09/957,731, filed Sep. 21, 2001, LeMaire et al.

* cited by examiner

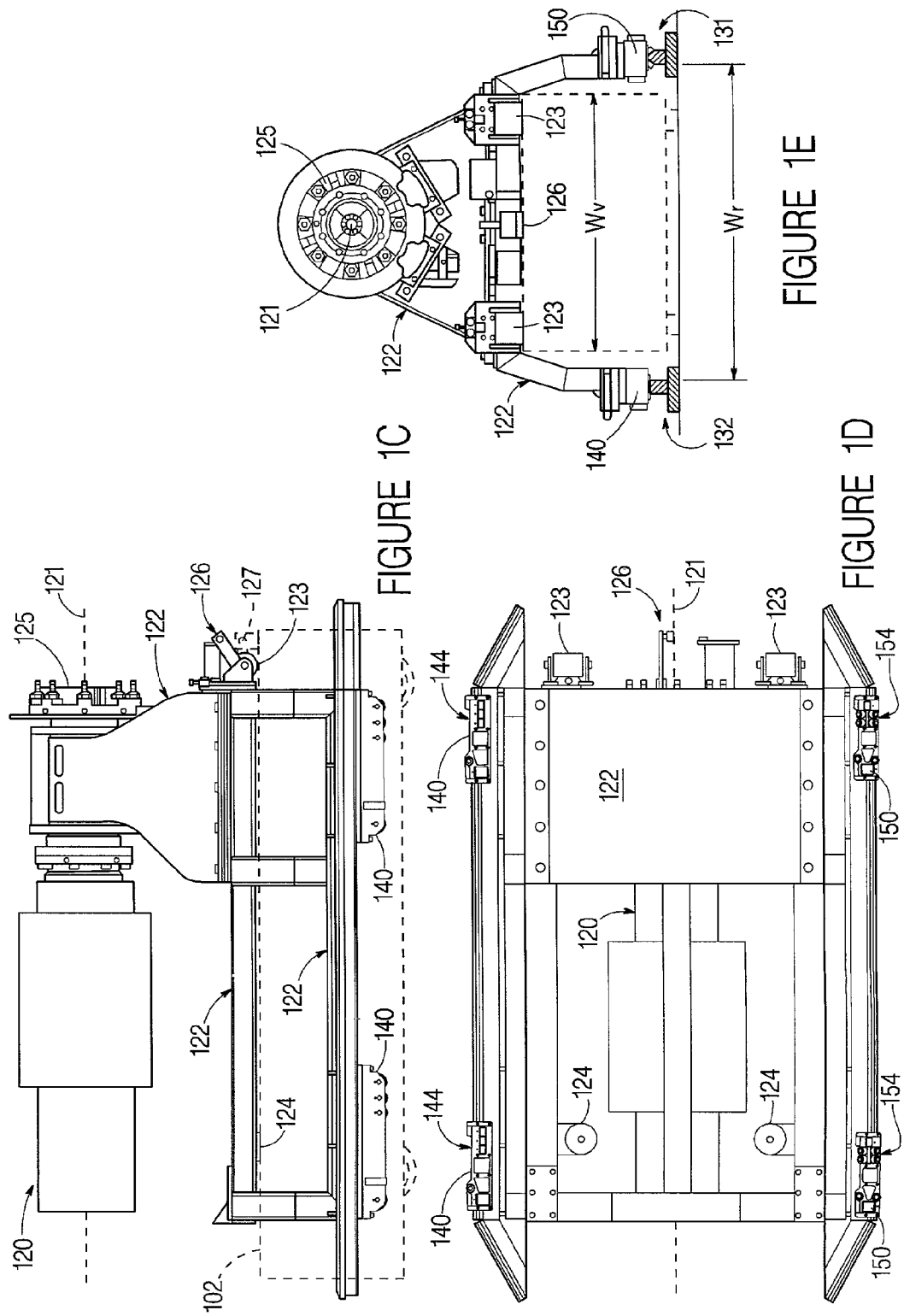

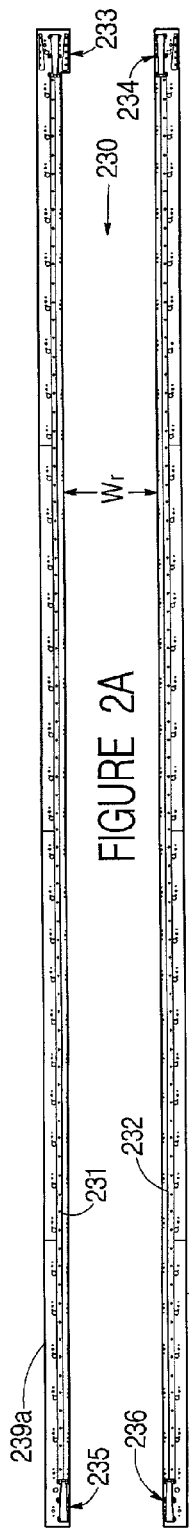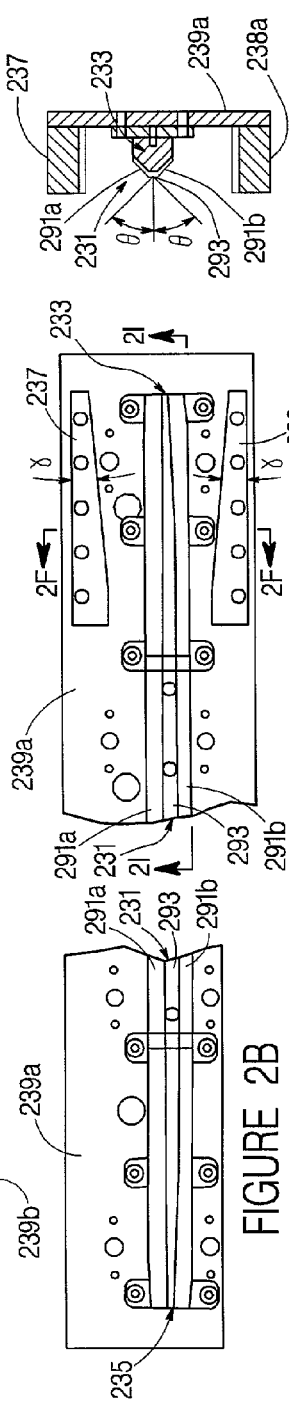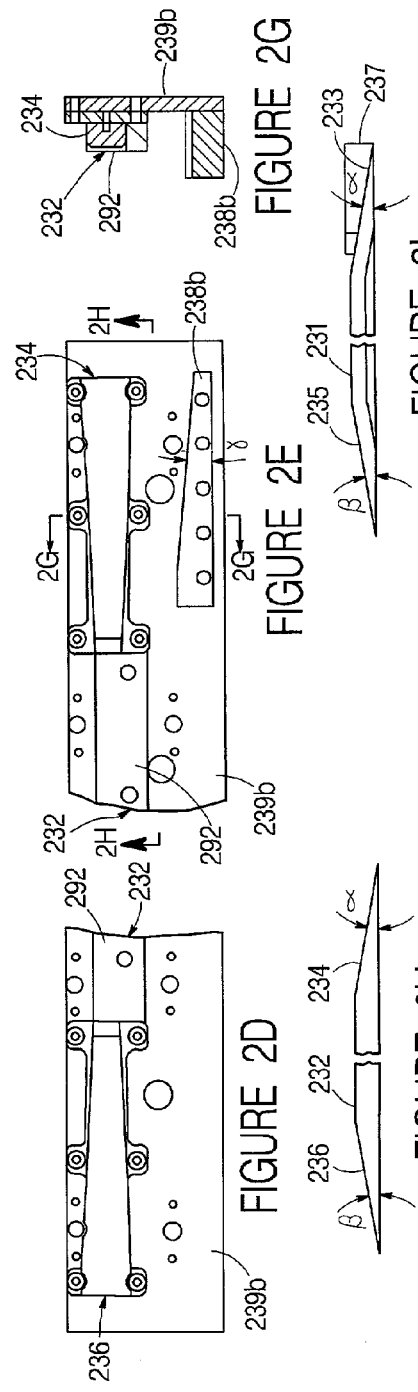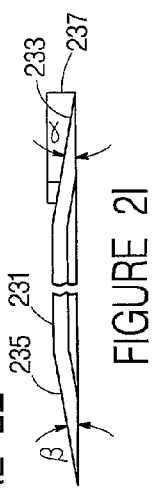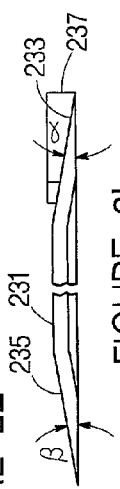

PRECISION ALIGNMENT OF TIRE BUILDING DRUM TO AUTOMATED TIRE BUILDING SYSTEM WORKING AXIS

CROSS-REFERENCE TO RELATED APPLICATIONS

This application relates to U.S. patent application entitled PRECISION LONGITUDINAL REGISTRATION OF TIRE BUILD DRUM TO FMS WORK STATION, Ser. No. 09/957,731 and filed on an even date herewith.

This application relates to U.S. patent application entitled METHOD FOR MANUFACTURING TIRES ON A FLEXIBLE MANUFACURING SYSTEM, Ser. No. 09/957,785 and filed on an even date herewith.

This application relates to U.S. patent application entitled BEAD LOADING METHOD AND APPARATUS, Ser. No. 09/957,740 and filed on an even date herewith.

TECHNICAL FIELD OF THE INVENTION

The present invention relates to automated tire building machines and, more particularly, to methods and apparatus for precisely aligning a moving tire building drum to the working axis of an automated tire building system.

BACKGROUND OF THE INVENTION

It is well known that the components of most pneumatic tire constructions must be assembled in a way which promotes good tire uniformity in order to provide proper tire performance. For example, a tread which "snakes" as it goes around the tire circumference will cause wobbling as the tire is operated. For example, a carcass ply which is lopsided (longer cords on one side of the tire than the other side) can cause a variety of tire nonuniformity problems including static imbalance and radial force variations. For example, a tire which is not meridionally symmetric (e.g., tread not centered between beads) can cause a variety of tire nonuniformity problems including couple imbalance, lateral force variations, and conicity. Therefore, in order to meet typical tire performance requirements, the tire industry generally expends considerable effort in producing tires with good uniformity. Tire uniformity is generally considered to mean tire dimensions and mass distributions which are uniform and symmetric radially, laterally, circumferentially, and meridionally, thereby producing acceptable results for measurements of tire uniformity including static and dynamic balance, and also including radial force variation, lateral force variation, and tangential force variation as measured on tire uniformity machines which run the tire under load on a road wheel.

Although certain degrees of tire nonuniformity can be corrected in post-assembly manufacturing (e.g., by grinding), and/or in use (e.g., applying balance weights to the rim of a tire/wheel assembly), it is preferable (and generally more efficient) to build-in tire uniformity as much as possible. Typical tire building machines comprise a tire building drum around which the tire components are wrapped in successive layers including, for example, an innerliner, one or more carcass plies, optional sidewall stiffeners and bead area inserts (e.g., apex), sidewalls, and bead wire rings (beads). After this layering, the carcass ply ends are wrapped around the beads, the tires are blown up into a toroidal shape, and the tread/belt package is applied. Typically the tire building drum is in a fixed location on the plant floor, and the various layers of components are applied manually or automatically using tooling registered to reference points on the fixed drum in order to ensure component placement with the desired degree of precision. The tooling is generally fixed relative to the tire building drum, for example a guide wheel on an arm extending from the same frame (machine base) which supports the tire building drum.

The present invention addresses the unique problems of alignment and registration which arise when the tire building drum is no longer fixed, but instead is a work-piece in a flexible manufacturing system (FMS) wherein the build drum is moved between automated work stations for application of successive component layers in successive work stations. The context of the present invention is an FMS having work-pieces (tire building drums) which are too large to allow the use of a precision pallet conveyor, so the tire building drums are moved (propelled) by other means which are not necessarily able, by themselves, to achieve sufficient accuracy in positioning the tire building drums relative to the work stations. The work stations each have a centerline, or "working axis" of the work station tire assembly devices (tools). Thus, one problem to be addressed is to precisely align the axis of the tire building drum with the working axis in each work station. Such alignment includes assuring that each point along the entire drum length of the tire building drum axis of revolution is within a specified precision distance of the work station working axis, i.e., alignment comprises making the tire building drum axis of revolution coincident with the work station working axis. A second problem, related to the first, is to precisely register the longitudinal position of the tire building drum relative to each work station. A solution to both problems provides three dimensional positioning of the tire building drum relative to the tools and devices of each work station with the desired degree of precision.

U.S. Pat. No. 4,314,864 (Loeffler, et al; 1982) discloses a method and apparatus for building a tire wherein a tire assembly drum (11) is mounted by means of a drum support (15) on a longitudinally movable carriage (12) which moves on a guideway (20) past a plurality of operation stations (A–G) spaced longitudinally along the guideway. Under control of an operator, the carriage/drum is moved to each station in succession, first to last, for successive tire assembly operations. Mechanical datum (30), fixedly located at each operation station, are provided to engage mechanical locators (31) secured to the carriage, and a bladder (42) is provided selectively to cause engagement of the locators with the mechanical datum at each successive station to locate the tire assembly drum precisely with respect to the operation station. After operations at the last operation station, the carriage is returned to the first operation station. The carriage is attached to an operator's platform (16) with which it moves longitudinally, propelled by a drive system (22) which moves the operator's platform. The carriage is individually supported on wheels (19) that ride along individual tracks, or rails (20) that form the guideway. Similarly, wheels (21) are provided under the operator's platform which roll along the ground powered by the drive system. An operator is normally positioned on the operator's platform with ready access to power and sequencing panels and controls. The carriage wheels and rails appear similar in construction to railroad rails and flanged wheels. The platform is controlled to stop the carriage at the various operation stations and does so with relative accuracy. Precise positioning is obtained by use of mechanical locators on the carriage which, upon lowering of the carriage by means of the bladder, interfit with a mechanical datum fixed at each operation station. The mechanical datum comprises preferably at least three frustroconical dogs (30) anchored in the floor. The mechanical locators comprise orienting plates 31 secured to the frame of the carriage, each having an aperture (33) the periphery of which is conically tapered to mate with one of the frustroconical dogs. In order to permit the carriage to move independent of the platform as it comes to rest in positive alignment upon the dogs, a tapered pin (45) and bracket (53) are used to attach the carriage to the platform. The tapered pin is mounted vertically on the carriage and has a long shank of reduced diameter. The bracket is mounted on the operator's platform and has a vertical tapered bore which matingly engages a conical portion of the tapered pin such that when the carriage is lowered onto the dogs, the tapered pin lowers, moving the reduced diameter shank into the bore of the bracket, thereby allowing relative movement between the pin and bracket, and therefore between the carriage and platform. A limitation of the disclosed tire building apparatus/method is that there is only one tire assembly drum being used to assemble only one tire at a time in all the operation stations, using them in sequence and then reversing direction to return to the first station to begin the next tire. Also, precision location involves sliding of surfaces between the dogs and orienting plates, thereby inducing wear and subsequent loss of precision necessitating part replacement for maintenance.

U.S. Pat. No. 1,309,894 (Kilborn; 1919; assigned to Goodyear), discloses an early form of tire assembly automation wherein a number of carcass-mounting units (5, FIG. 1) are arranged in a linear "aligned" series, and a treading/stitching machine (12) rides on a trackway (7) for intermittent correlation with each of the carcass-supporting units of the series. Referring to FIG. 4, the trackway is seen to comprise a pair of flat-topped rails (23, 24) upon which ride wheels (22, 18) which have flanges (28, 26) to hold the wheels on the rails similar to conventional railroad rails and wheels. There are two front wheels (22) and two rear wheels (18). The treading/stitching machine can be rolled off the rails to ride on the floor by means of an extra flange (28) on the front wheels sized to allow the machine to roll about on the wheel flanges. The machine is "readily pushed into a centered position before any of the tires, its weight serving to maintain it stationary during the stitching of any of the tire treads . . . " upon the trackway by a human operator, who uses a pointer (58, FIG. 3) to center the machine relative to a tire carcass: "The operator has but to mark the center of a tire carcass and arrange the machine with the pointer (58) in alignment with the mark on the tire."

The present invention is intended to overcome the limitations of the prior art by providing method and apparatus for alignment of moving tire building drums in automated tire building systems.

BRIEF SUMMARY OF THE INVENTION

According to the invention, a method for aligning three or more tire building drums moving through three or more work stations of an automated tire building system, comprises the step of independently moving each tire building drum through the three or more work stations so that an axis of revolution of each tire building drum is coincident with a working axis extending through the three or more work stations.

According to the invention, the method further comprises the step of positioning the three or more work stations to be aligned to and spaced along a common, linear working axis.

According to the invention, the method further comprises the steps of: providing a rail system of two approximately parallel rails extending parallel to the working axis through the three or more work stations; and causing each tire building drum to ride on the rail system through the three or more work stations. Further steps comprise: using both of the approximately parallel rails for supporting and vertically aligning each tire building drum as it rides through the three or more work stations; and using one of the approximately parallel rails for laterally aligning each tire building drum as it rides through the three or more work stations. Even further steps comprise: providing a substantially flat top on a first rail of the two approximately parallel rails; providing a substantially inverted V-shaped top on a second rail of the two approximately parallel rails; providing at least one flat roller attached to each tire building drum to ride on the first rail; and providing at least two pairs of V-mounted rollers attached to each tire building drum to ride on the second rail.

According to the invention, the method further comprises the steps of: independently moving each tire building drum with a self-propelled vehicle traveling along the rail system; and flexibly attaching each tire building drum to a one of the vehicles. Further steps comprise: resting the tire building drum on the vehicle for moving the tire building drum to and from the rail system; providing entry ramps on the rail system for raising the tire building drum off of the vehicle in order to ride on the rail system through the three or more work stations; and providing exit ramps on the rail system for lowering the tire building drum in order to rest on the vehicle instead of riding on the rail system while not moving through the three or more work stations. Further steps comprise: laterally funneling the tire building drum into the rail system at the entry ramps; and providing flat rollers attached to the tire building drum to ride up the entry ramps and to ride down the exit ramps.

According to the invention, apparatus for aligning three or more tire building drums moving through three or more work stations of an automated tire building system comprises means for independently moving each tire building drum through the three or more work stations so that an axis of revolution of each tire building drum is coincident with a working axis extending through the three or more work stations.

According to the invention, the apparatus further comprises: a rail system of two approximately parallel rails extending parallel to the working axis through the three or more work stations; and means for enabling each tire building drum to ride on the rail system through the three or more work stations. The apparatus further comprises: means for using both of the approximately parallel rails for supporting and vertically aligning each tire building drum as it rides through the three or more work stations; means for using one of the approximately parallel rails for laterally aligning each tire building drum as it rides through the three or more work stations; means for independently moving each tire building drum; and means for flexibly attaching each tire building drum to the moving means. The apparatus further comprises: means for supporting and moving the tire building drum to and from the rail system; entry means on the rail system for changing support of the tire building drum to the rail system while the tire building drum rides through the three or more work stations; and exit means on the rail system for changing support of the tire building drum to the supporting and moving means instead of riding on the rail system while not moving through the three or more work stations.

According to the invention, apparatus is disclosed for precision alignment of a moving tire building drum to an automated tire building system working axis, wherein the automated tire building system comprises one or more work stations with application drums aligned to the working axis, and a plurality of tire building drums wherein each tire building drum is independently moved into and out of each work station, the apparatus comprising: a drum support frame having, under a one lateral side of the drum support frame, a total of at least one flat bearing roller; and, under an opposing lateral side of the drum support frame, having a total of at least two pairs of V-mounted bearing rollers; a rail system comprising a first and a second approximately parallel rails passing through the one or more work stations, wherein the first rail is substantially flat-topped such that the at least one flat bearing roller rides on the first rail; and the second rail is substantially inverted V-shaped on top such that the at least two pairs of V-mounted bearing rollers ride on the second rail; and positioning of apparatus components such that the drum support frame, the flat bearing rollers and the V-mounted bearing rollers are positioned relative to the tire building drum and the first and second rails; and the first and second rails are positioned relative to the working axis; such that when the at least one flat bearing roller rides on the first rail and the at least two pairs of V-mounted bearing rollers ride on the second rail, the tire building drum is riding on the rail system and is precision aligned to the working axis.

According to the invention, the apparatus can be characterized in that: the one or more work stations are aligned to and spaced along a common, linear working axis; and the first and second approximately parallel rails comprise a single set of rails passing continuously through all of the one or more work stations.

According to the invention, the apparatus further comprises: a self-propelled vehicle traveling along the rail system for independently moving the tire building drum; and a flexible attachment between the tire building drum and the vehicle. The apparatus further comprises: entry ramps with funneling side ramps on an end of the rail system where the tire building drum enters the rail system to ride through the work station; exit ramps on an end of the rail system where the tire building drum exits the rail system after riding through the work station; a truncated vertex of the substantially inverted V-shape of the second rail to create a substantially flat upper surface on the second rail and on its entry ramp and exit ramp; one front flat roller mounted before, and one rear flat roller mounted after the at least two pairs of V-mounted bearing rollers, the front and rear flat rollers positioned to ride up the second entry ramp and to ride down the second exit ramp while having clearance to avoid using the front and rear flat rollers on the second rail; and side rollers on the drum support frame positioned to engage with the funneling side ramps to laterally funnel the V-mounted bearing rollers onto the second rail.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity. Elements of the figures are typically numbered as follows. The most significant digit (hundreds) of the reference number corresponds to the figure number. Elements of FIG. 1 are typically numbered in the range of 100–199. Elements of FIG. 2 are typically numbered in the range of 200–299. Similar elements throughout the drawings may be referred to by similar reference numerals. For example, the element 199 in a figure may be similar, and possibly identical to the element 299 in another figure. Elements of the figures can be numbered such that similar (including identical) elements may be referred to with similar numbers in a single drawing. For example, each of a plurality of elements collectively referred to as 199 may be referred to individually as 199a, 199b, 199c, etc. Or, related but modified elements may have the same number but are distinguished by primes. For example, 109, 109', and 109" are three different elements which are similar or related in some way, but have significant modifications, e.g., a tire 109 having a static imbalance versus a different tire 109' of the same design, but having a couple imbalance. Such relationships, if any, between similar elements in the same or different figures will become apparent throughout the specification, including, if applicable, in the claims and abstract.

Figure 1A:
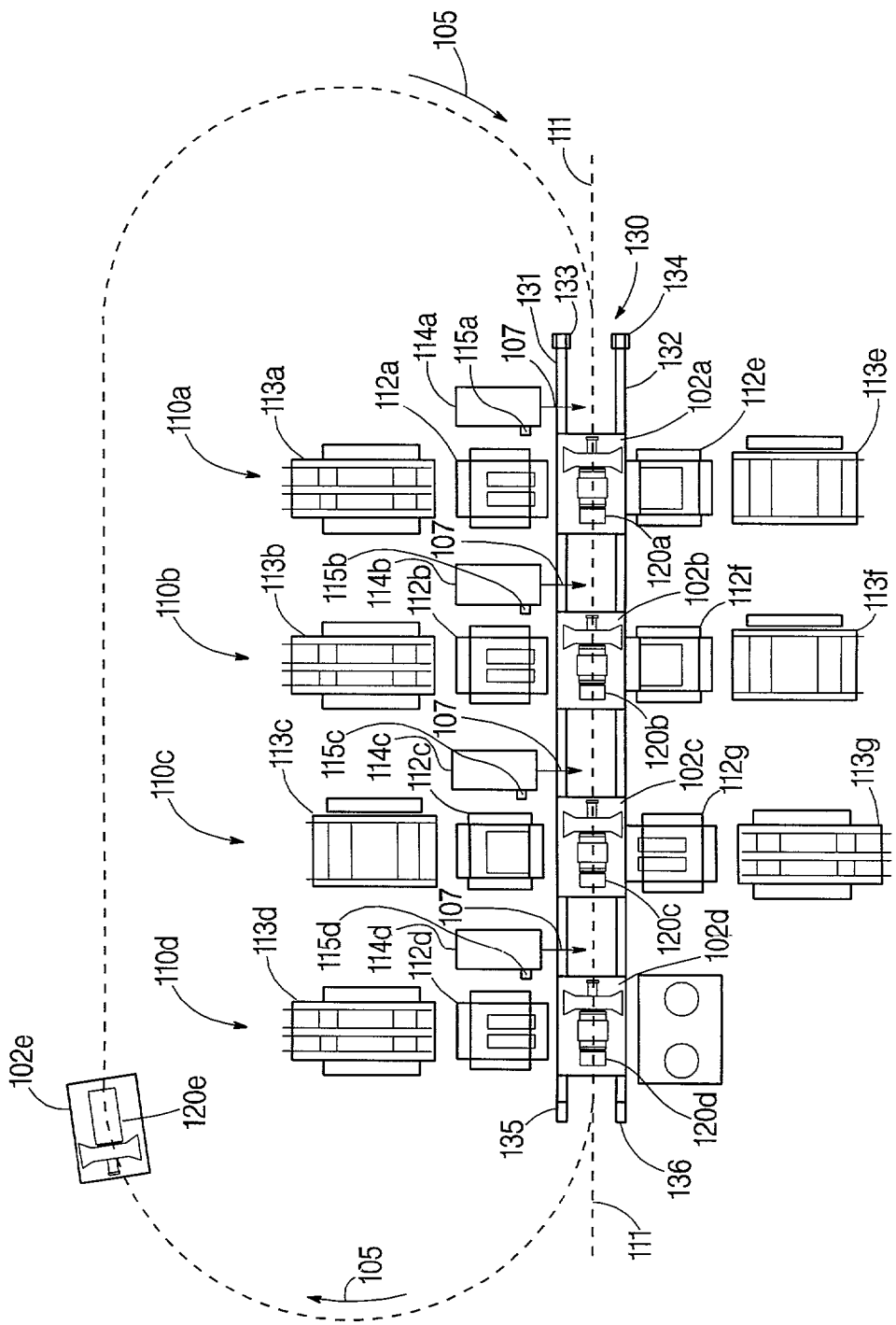
Figure 1B:
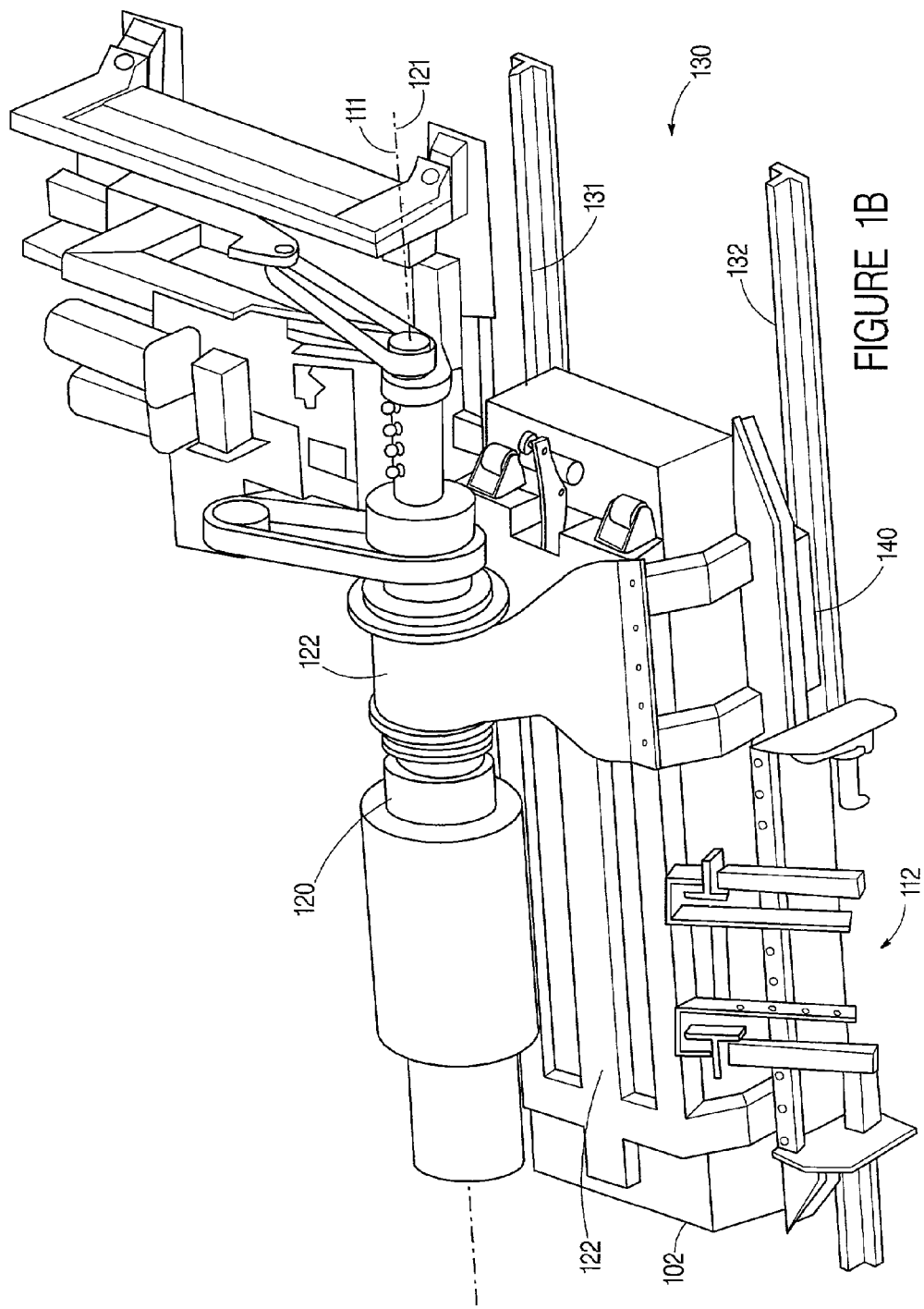
Figure 3A:
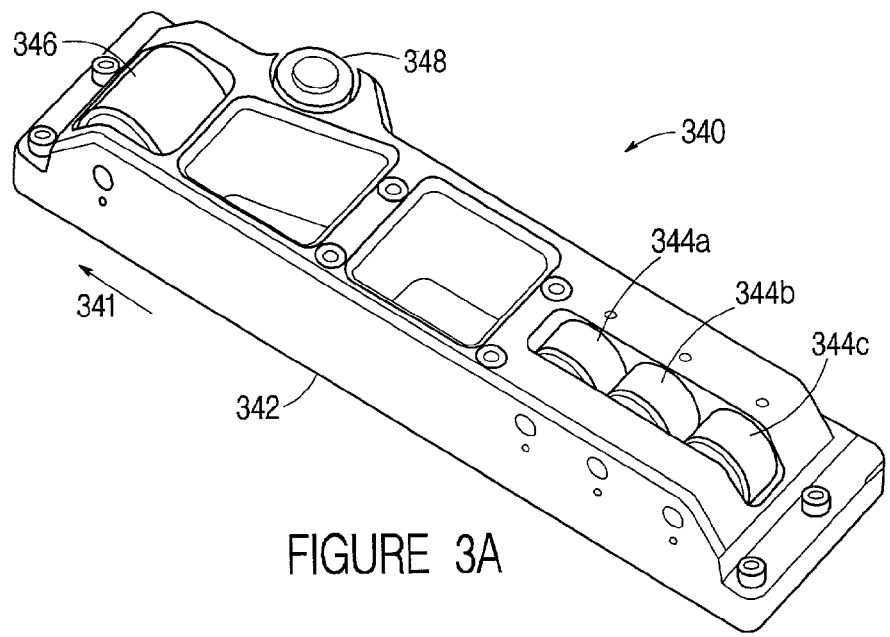
Figure 3B:
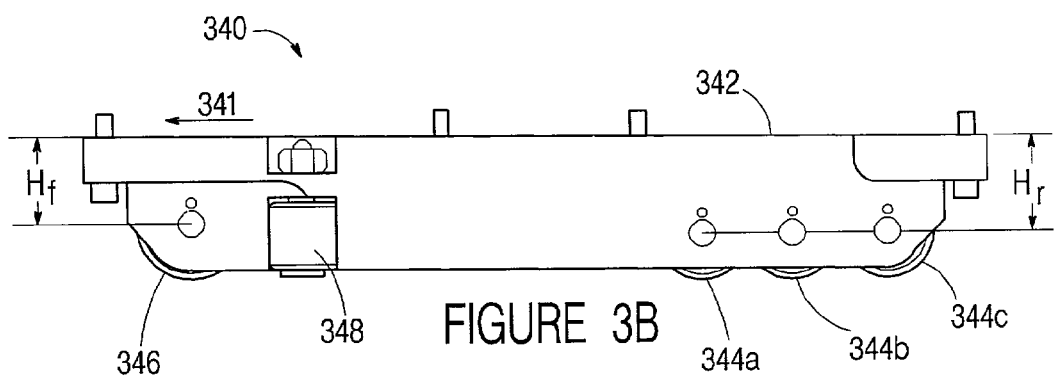
Figure 3C:
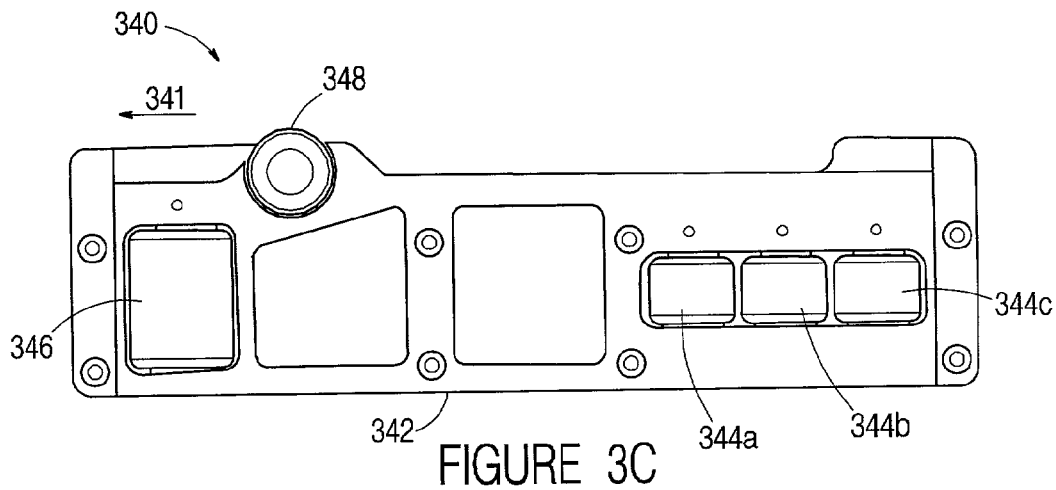
Figure 4A:
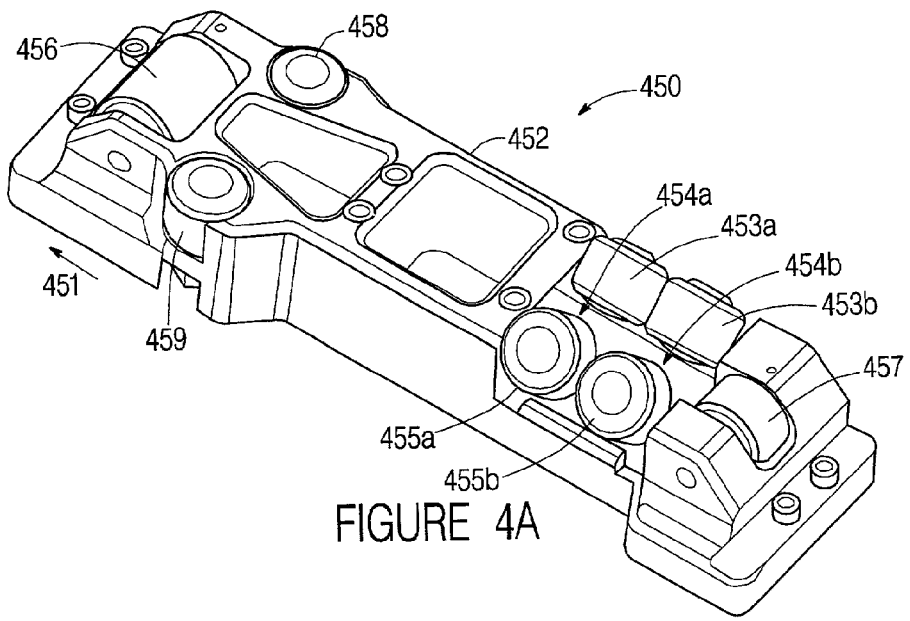
Figure 4B:
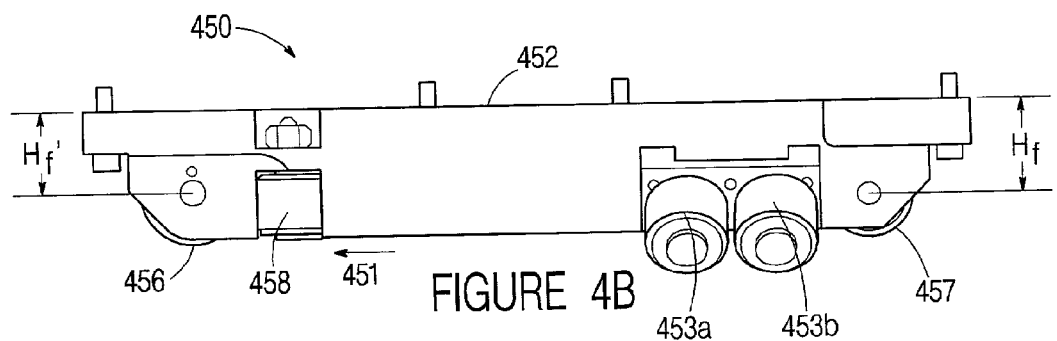
Figure 4C:
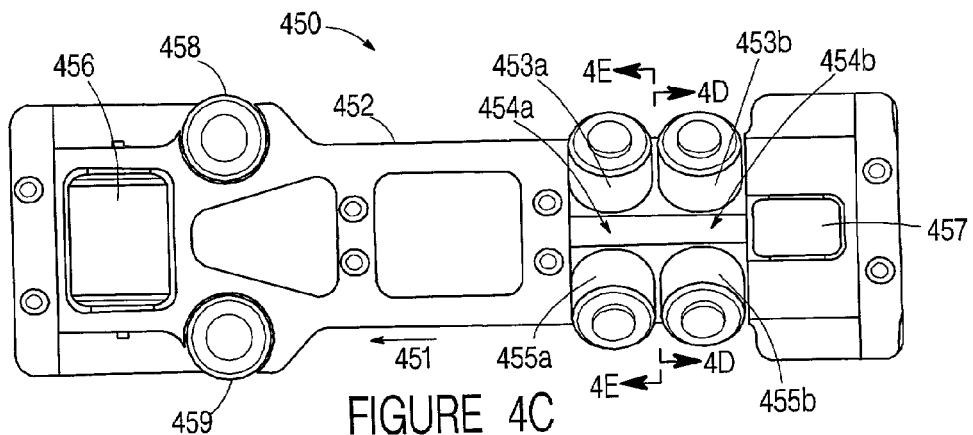
Figure 4D:
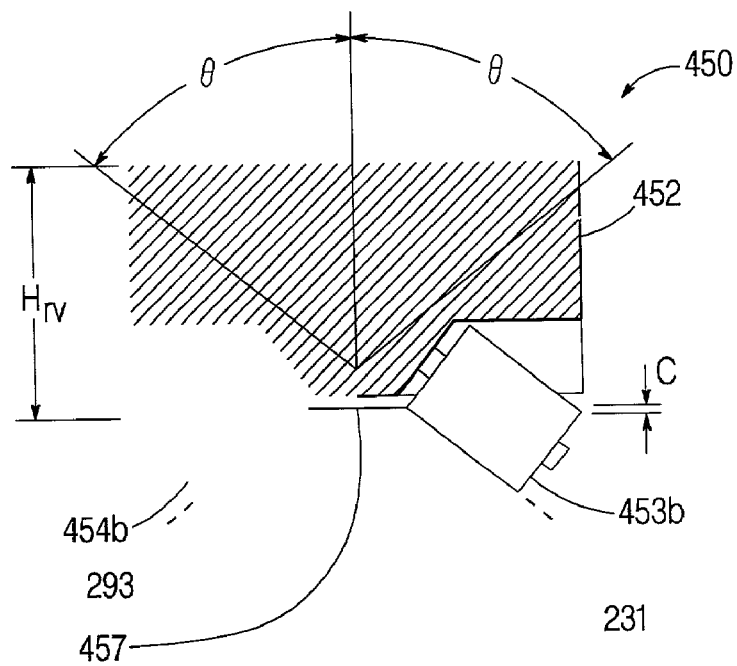
Figure 4E:
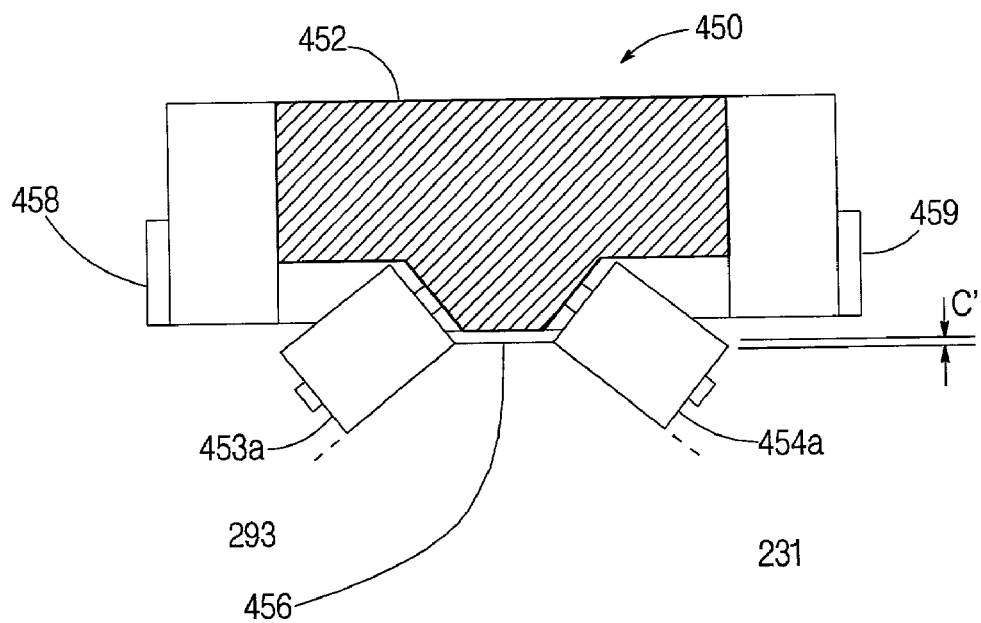

The structure, operation, and advantages of the present preferred embodiment of the invention will become further apparent upon consideration of the following description taken in conjunction with the accompanying drawings, wherein:

FIG. 1A is a schematic view of an automated tire building system (FMS), according to the invention;

FIG. 1B is a perspective view of a workstation of the FMS showing a tire building drum in precision placement relative to an application drum, according to the invention;

FIGS. 1C, 1D and 1E are three views (side, bottom and end view, respectively) of a tire building drum on a drum support frame, according to the invention;

FIG. 2A is a top view of a rail FMS system, according to the invention;

FIG. 2B is a top view of a V-rail exit ramp of the rail system of FIG. 2A, according to the invention;

FIG. 2C is a top view of a V-rail entry ramp of the rail system of FIG. 2A, according to the invention;

FIG. 2D is a top view of a flat rail exit ramp of the rail system of FIG. 2A, according to the invention;

FIG. 2E is a top view of a flat rail entry ramp of the rail system of FIG. 2A, according to the invention;

FIG. 2F is a cross-sectional end view of the V-rail entry ramp of FIG. 2C, taken on the line 2F—2F, according to the invention;

FIG. 2G is a cross-sectional end view of the flat rail entry ramp of FIG. 2E, taken on the line 2G—2G, according to the invention;

FIG. 2H is a side view of the flat rail of the rail system of FIG. 2A, taken on the line 2H—2H shown in FIG. 2E, according to the invention;

FIG. 2I is a side view of the V-rail of the rail system of FIG. 2A, taken on the line 2I—2I shown in FIG. 2C, according to the invention;

FIGS. 3A, 3B and 3C are three views (perspective, side, and bottom view, respectively) of a flat skate, according to the invention;

FIGS. 4A, 4B and 4C are three views (perspective, side, and bottom view, respectively) of a V-skate, according to the invention;

FIG. 4D is a cross-sectional end view of the V-skate of FIG. 4C, taken on the line 4D—4D, according to the invention; and FIG. 4E is a cross-sectional end view of the V-skate of FIG. 4C, taken on the line 4E—4E, according to the invention.

DETAILED DESCRIPTION OF THE INVENTION

The present invention concerns precision placement of a tire building drum relative to tools (tire building devices such as "application drums") of a work station when the tire building drum comprises a moving work-piece in an automated tire building system (FMS or flexible manufacturing system) having one or more work stations, and the tire building drum is moved (propelled) into and out of each work station. The application drums of each work station are aligned vertically and horizontally to a working axis, and are positioned longitudinally along the working axis, which working axis preferably extends linearly through all of the one or more work stations in sequence from first to last, such that the first tire building operations are performed in the first work station, and the last tire building operations are performed in the last work station. Thus, precision placement of the tire building drum at each work station can be accomplished by precisely aligning the axis of the tire building drum to the working axis at each work station, and by precisely positioning a tire building drum longitudinal reference point to a corresponding work station longitudinal reference point at each work station. Tire building drums are typically too large to allow the use of a precision pallet conveyor so, in the preferred embodiment, the tire building drums are moved by self-powered vehicles riding on wheels upon the plant floor. Since the vehicles, by themselves, are unable to achieve sufficient accuracy in positioning the tire building drums relative to the work station application drums, the present invention provides additional methods and means for precision placement of the tire building drum.

FIG. 1A illustrates a preferred embodiment of a tire building FMS 100 incorporating the positioning methods and means of the present invention. A plurality of self-powered vehicles (AGV) 102 (five shown: 102a, 102b, 102c, 102d, 102e) move corresponding tire building drums 120 (120a, 120b, 120c, 120d, 120e) through a plurality of work stations 110 (four shown: 110a, 110b, 110c, 110d), in the direction shown by arrows 105. The AGVs 102 follow a path determined by a guide wire 104 embedded in the plant floor, shown in FIG. 1A as an oval path passing through the work stations 110 from a first work station 110a to a last work station 110d, then looping back around to the first work station 110a. The work stations 110 are aligned to, and spaced along, a common, linear working axis 111, and the AGV guide wire 104 is approximately parallel to the working axis 111 where the guide wire 104 passes through the work stations 110. Also parallel to the working axis 111 and passing through the work stations 110 is a rail system 130 comprising a V-rail 131 (precisely parallel to the working axis 111), a flat rail 132 (approximately parallel to the working axis 111), a V-rail entry ramp 133, a V-rail exit ramp 135, a flat rail entry ramp 134, and a flat rail exit ramp 136. Each work station 110 comprises one or more application drums 112 (seven shown: 112a, 112b, 112c, 112d, 112e, 112f, 112g), one or more supply reels 113 (seven shown: 113a, 113b, 113c, 113d, 113e, 113f, 113g), and an intake server 114 (four shown: 114a, 114b, 114c, 114d). The application drums 112 are precisely aligned vertically and horizontally to the working axis 111, and are positioned longitudinally along the working axis 111 relative to a work station longitudinal reference point 115 (four shown: 115a, 115b, 115c, 115d) established for each work station 110, for example on a forward surface of the intake server 114. Although self-powered, and automated to follow the guide wire 104, the AGVs 102 are also subject to external control, for example by radio signal and/or proximity switches, so that the AGVs 102 can be controlled to stop at each work station 110 for a suitable amount of time before proceeding to the next workstation 110.

An exemplary sequence of operations for the tire building FMS 100 is as follows, wherein a green tire carcass is built. For the first step of a green tire carcass building process, the AGV 102a moves an empty tire building drum 120a into the first work station 110a and stops approximately at a desired stopping point within the first work station 110a. The intake server 114a extends laterally (in the direction of the arrow 107) to a position behind the tire building drum 120a, couples to the tire building drum 120a while uncoupling the tire building drum 120a from the AGV 102a, and moves the tire building drum 120a into a precision longitudinal position by mating a drum reference point 125 (as shown in FIG. 1C) with the work station longitudinal reference point 115a. Simultaneously, as will be described in detail hereinbelow, the tire building drum 120a is precisely aligned with the working axis 111 by the rail system 130, thereby providing precision placement in three dimensions of the tire building drum 120a relative to the application drums 112a, 112e of the first work station 110a. Now the application drums 112 can apply the first layers of tire components, pulling the components from their supply reels 113. In the preferred embodiment, power and control signals are communicated to/from the tire building drum 120 by the intake server 115. For example: one innerliner is pulled from the supply reel 113e and applied by the application drum 112e, and a pair of toe guards are pulled from the (double) supply reel 113a and applied by the application drum 112a. When the application processes are completed in the workstation 110a, the intake server 114a releases the tire building drum 120a and re-couples it to the AGV 102a, uncouples and retracts to a position clear of the path of the AGVs 102 and tire building drums 120, thereby allowing the AGV 102a to move the tire building drum 120a to the next work station 110b. In order to clear the way, all AGVs 102a, 102b, 102c, 102d present in workstations 110a, 110b, 110c, 110d move approximately simultaneously, but do not have to be connected together. For the next step of the green tire carcass building process, the AGV 102a moves the tire building drum 120a into the second work station 110b whereupon operations similar to those described for the first work station 110a are performed, thereby applying further tire carcass components from the supply reels 113b, 113f of the second work station 110b. At approximately the same time, the AGV 102e has moved an empty tire building drum 102e into the first workstation 110a for application of the first tire carcass components. The above steps are repeated as the AGVs 102 move the tire building drums 120 through all of the work stations 110 in sequence, so that the tire carcass components are applied in their proper sequence on the tire building drums 120. After completion of the application of components in the last work station 110d, the built green tire carcass may be removed from the tire building drum 120 for further processing in subsequent tire manufacturing stages (not shown), thus emptying the tire building drum 120e so that it may be moved by the AGV 102e back around the path of the guide wire 104, ready to start another green tire carcass building process in the first work station 110a. An inside bead wire ring may be applied to the empty tire building drum 120e at any time after removing the built green tire carcass, conveniently as part of the carcass removal operation in the last workstation 110d.

FIG. 1B illustrates a workstation 110 with a tire building drum 120 in precision placement relative to an application drum 112 (partially shown in cutaway). The intake server 114 is extended and coupled to the tire building drum 120, thereby establishing a precise longitudinal position for the tire building drum 120. The tire building drum 120 is supported by a drum support frame 122 which in turn sits above the AGV 102. A portion of the rail system 130 comprising the V-rail 131 and the flat rail 132 is shown supporting and aligning the tire building drum 120 through skates (one flat skate 140 visible) attached to the bottom of the drum support frame 122, thereby precisely aligning the tire building drum 120 with the working axis 111, i.e., making an axis of rotation 121 (also see FIG. 1E) of the tire building drum 120 precisely coincident with the working axis 111.

FIGS. 1C, 1D, and 1E illustrate side, bottom, and rear end views, respectively, of the drum support frame 122 with important elements attached thereupon. For reference, an AGV 102 is shown in dashed outline in FIGS. 1C and 1E, and cross-sections of the V-rail 131 and flat rail 132 are shown in FIG. 1E. The tire building drum 120 is cantilever mounted to the drum support frame 122 to allow complete rings such as tire beads to be applied during tire building, and also to allow a completed green tire carcass to be removed. The tire building drum 120 is rotatable about a central axis of rotation 121 rotating in one or more bearings (not shown) between the tire building drum 120 and the drum support frame 122.

The drum reference point 125 is a rear-facing end surface of the tire building drum 120, but could be any fixed point on the tire building drum 120 or drum support frame 122. Because of the potential for "play" in the bearing connection between drum and frame, it is preferable to make the drum reference point 125 a rigid part of the tire building drum 120, such as shown, in order to achieve the best precision in longitudinal positioning of the tire building drum 120. A coupling arm 126 is attached to the rear end of the drum support frame 122 and is used by the intake server 114 to move the tire building drum 120 into a precision longitudinal position by mating the drum reference point 125 with the work station longitudinal reference point 115 (see FIG. 1A) of the workstation 110. The coupling arm 126 is also flexibly attached to the AGV 102 via a crank arm 127, thus providing means for the AGV to move the drum support frame 122, and thus the tire building drum 120, even when the drum support frame 122 is not directly resting on top of the AGV 102, i.e., when the tire building drum 120 is riding on the rail system 130. Otherwise, when not riding on the rail system 130, the drum support frame 122 has a pair of rollers 123 and a pair of pads 124 to support it when resting on top of the AGV 102. The flexible connection 126/127 between the drum support frame 122 and the AGV 102 which is provided by the coupling arm 126 and crank arm 127 enables the AGV 102 to move the drum support frame 122 (and therefore the tire building drum 120) while also allowing limited movement of the drum support frame 122 relative to the AGV 102 as the tire building drum 120 is raised, lowered and shifted laterally by the rail system 130 for precision alignment with the working axis 111; and also allowing temporary uncoupling for precision longitudinal positioning.

To enable precision alignment of the tire building drum 120 with the working axis 111, skates 140, 150 with bearing rollers 144, 154, respectively, designed to ride on the rails 132, 131, respectively, of the rail system 130 are attached to the underside of the drum support frame 122. Two skates, one fore and one aft, on each side of the drum support frame 122 assure alignment of the axis of rotation 121 over the entire length of the tire building drum. It should be noted that, although multiple bearing rollers are used in the skates 140, 150 in order to adequately support the weight of the drum support frame 122 and attachments, a minimum arrangement sufficient for precision alignment would comprise two pairs of V-mounted bearing rollers 154 on the V-rail side of the drum support frame 122, and a single flat bearing roller 144 on the flat rail side of the drum support frame 122. In order to provide an adequate tripod support as well as adequate positioning control, the two pairs of V-mounted bearing rollers 154 should be spaced apart (in one or two skates), preferably placed as shown for the V-skates 150 in FIG. 1D close to the fore and aft ends of the drum support frame 122; and the single flat bearing roller 144 should preferably be placed close to the fore-aft middle of the opposite side of the drum support frame 122. Especially in light of the description hereinbelow of the skate 140, 150 and rail 131, 132 designs, it will be seen that two pairs of properly positioned V-mounted bearing rollers 154 riding on a properly aligned V-rail 131 will provide alignment in the horizontal plane; that a single flat bearing roller 144 riding on a flat rail 132 positioned with the proper height will provide alignment in the vertical plane; and that the triangular arrangement of two pairs of V-mounted bearing rollers 154 riding on a V-rail 131 plus a single flat bearing roller 144 riding on a flat rail 132 will provide stable tripod support of the drum support frame 122 (assuming a suitable base area-to-height ratio).

FIG. 2A illustrates the rail system 230 (compare 130), and FIGS. 2B through 2I illustrate features of the rail system 230 in other views. The rail system 230 comprises a V-rail 231 (compare 131) and a flat rail 232 (compare 132) which are approximately parallel and spaced apart by a width "Wr" that is large enough to accommodate the width "Wv" of the AGV 102 (see FIG. 1E) which must pass between the rails 231, 232. As described hereinabove, when suitably affixed to a supporting surface (e.g., the plant floor), the rail system 230 passes through the FMS 100 work stations 110; the V-rail 231 is precisely parallel to the working axis 111; the flat rail 232 is approximately parallel to the V-rail 231; and the heights of the rails 231, 232 are adjusted to provide precision alignment of the tire building drum 120 when it is supported by a drum support frame 122 having attached skates 150, 140 which are riding on the rails 231, 232, respectively. It should be understood that, since the skates 150, 140 ride on upper surfaces 291, 292 of the rails 231, 232, respectively, therefore it is the upper ridden-upon (i.e., bearing) surfaces 291, 292 which require the aforementioned parallelism and adjusted heights. In order to avoid sliding wear, the flat rail 232 is preferably made to be as nearly parallel as possible to the V-rail 231. The rail system 230 further comprises a V-rail entry ramp 233 (compare 133), a V-rail exit ramp 235 (compare 135), a flat rail entry ramp 234 (compare 134), and a flat rail exit ramp 236 (compare 136). Each rail 231, 232 is preferably a single length of steel or other suitable material, but may be composed of shorter lengths combined by known means to be suitably linear and smooth-surfaced. Base plates 239a, 239b are optionally affixed to the rails 231, 232 and ramps 233, 234, 235, 236 (e.g., by screws) to provide, for example, a broader base, extra rigidity, convenient flanges for floor attachment, a means for holding together all the various parts of the rail system 230, and etc. Each base plate 239a, 239b is preferably a single length of steel or other suitable material, but may be composed of shorter lengths preferably combined in a way such that the resulting joints are not coincident with joints of the other various parts of the rail system 230.

With reference to the cross-sectional view of FIG. 2G, the flat rail 232 is seen to have a substantially linear, level, horizontal and "flat" upper surface 292 extending across the width and continuously from end to end, although the long edges can be beveled or rounded to avoid sharp corners. The flat rail 232 is preferably a single length of steel or other suitable material, but may be composed of shorter lengths preferably combined in a way such that the resulting joints are not coincident with joints of the other various parts of the rail system 230 (e.g., the base plate(s) 239b), and the joints should not introduce any irregularity in the flat upper surface 292 of the flat rail 232. With reference to FIGS. 2A, 2D and 2E, an entering end of the flat rail 232 joins the flat rail entry ramp 234 in a joint without irregularity in the upper surface 292, and an exiting end of the flat rail 232 joins the flat rail exit ramp 236 in a joint without irregularity in the upper surface 292.

With reference to the cross-sectional view of FIG. 2F, the V-rail 231 is seen to have a substantially linear, truncated inverted V-shaped upper surface 291/293 extending continuously from end to end. The two side upper surfaces 291 (291a, 291b) of the inverted V-shape are at equal angles $\theta$ with respect to the vertical, and the angle $\theta$ is preferably 45 degrees so that the reaction forces of the V-rail 231 to the weight of a V-skate 150 are directed equally upward for support and laterally for alignment. The vertex of the inverted V-shape is sufficiently truncated to create a flat surface 293 providing clearance for flat rollers also present on the V-skate 150, as will be described hereinbelow. The V-rail 231 is preferably a single length of steel or other suitable material, but may be composed of shorter lengths preferably combined in a way such that the resulting joints are not coincident with joints of the other various parts of the rail system 230 (e.g., the base plate(s) 239a), and the joints should not introduce any irregularity in the upper surfaces 291/293 of the V-rail 231. With reference to FIGS. 2A, 2B and 2C, an entering end of the V-rail 231 joins the V-rail entry ramp 233 in a joint without irregularity in the upper surfaces 291/293, and an exiting end of the V-rail 231 joins the V-rail exit ramp 235 in a joint without irregularity in the upper surfaces 291/293.

To facilitate entry of the skates 150, 140 onto the rails 231, 232 respectively, entry ramps 233, 234 are provided. Referring to FIGS. 2H and 2I, the side cross-section view illustrates how the entry ramps 233, 234 provide flat upper surfaces 293, 292 with a gradual upward slope of angle $\alpha$ which is on the order of a few degrees, for example 2 degrees, so that even a relatively fast moving AGV 102 will still produce a smooth gradual raising up of the tire building drum 120 as the skates 150, 140 roll up the entry ramps 233, 234. With reference to the detail views of FIGS. 2C and 2E, and the cross-sectional views of FIGS. 2F and 2G, it can be seen that both the V-rail entry ramp 233 and the flat rail entry ramp 234 provide a flat surface 293, 292, respectively, upon which a flat roller rides up the ramp of angle $\alpha$. In the case of the V-rail entry ramp 233, it is the truncated vertex of the V-shaped railing that provides the flat surface 293. As will be discussed hereinbelow, the V-skate 150 has a special flat roller (456 in FIG. 4A) on its forward end to enable the V-skate 150, 450 to smoothly ride up the V-rail entry ramp 233. A person skilled in the relevant arts will appreciate that roller pairs V-mounted in a horizontal skate cannot roll up a ramped V-rail without also sliding, which causes undesirable wear.

To facilitate exit of the skates 150, 140 off the rails 231, 232 respectively, exit ramps 235, 236 are provided. Referring to FIGS. 2H and 2I, the side cross-section view illustrates how the exit ramps 235, 236 provide flat upper surfaces 293, 292 with a gradual downward slope of angle $\beta$ which is on the order of a few degrees, for example 2 degrees, so that even a relatively fast moving AGV 102 will still produce a smooth gradual lowering down of the tire building drum 120 as the skates 150, 140 roll down the exit ramps 235, 236. With reference to the detail views of FIGS. 2B and 2D, it can be seen that both the V-rail exit ramp 235 and the flat rail exit ramp 236 provide a flat surface 293, 292, respectively, upon which a flat roller rides down the ramp of angle $\beta$. In the case of the V-rail exit ramp 235, as in the case of the V-rail entry ramp 233, it is the truncated vertex of the V-shaped railing that provides the flat surface 293. As will be discussed hereinbelow, the V-skate 150 has a special flat roller (457 in FIG. 4A) on its rearward end to enable the V-skate 150, 450 to smoothly ride down the V-rail exit ramp 235.

FIGS. 2C, 2E, 2F, and 2G also illustrate side ramp features of the rail system 230 which provide funneling of skates 150, 450, 140, 340 entering the rail system 230. Since the V-skate 150, 450 provides precision lateral positioning when the V-mounted bearing roller pairs 154, 454 are riding on the V-rail 231, it is important to funnel in the V-skate 150, 450 as it enters the rail system 230 via the V-rail entry ramp 233. Side ramps 237, 238a having a suitable entry angle $\gamma$ (e.g., approximately 5 degrees) mounted as shown on both sides of the V-rail entry ramp 233 cause lateral alignment of the V-skate 150, 450 with the V-rail 231. Since the V-skate 150, 450 is attached to the drum support frame 122, lateral alignment of the V-skate 150, 450 also produces lateral alignment of the drum support frame 122 and all other components attached to it, such as the tire building drum 120 and the flat skate 140, 340. An alternative funneling method assumes consistent spacing between the V-skate 150, 450 mounted on one side of the drum support frame 122 and a corresponding flat skate 140, 340 mounted on the opposing side of the drum support frame 122, and therefor comprises the side ramp 237 mounted outward of the V-rail entry ramp 233 plus a side ramp 238b mounted outward of the flat rail entry ramp 234 (as an alternative to the side ramp 238a mounted inward of the V-rail entry ramp 233). All of the side ramps 237, 238a, 238b have a similar suitable entry angle $\gamma$ (e.g., approximately 5 degrees). As will be seen from the skate descriptions hereinbelow, the V-skates 150, 450 (and the flat skates 140, 340) have vertical side rollers 459 and 458 or 348 suitably mounted for rolling against the side ramps 237 and 238a or 238b. It may be noted that V-mounted bearing roller pairs 154, 454 will naturally provide a certain amount of centering (funneling) when they come into contact with the V-rail 231, but the amount of centering is limited, and will cause sliding wear on the V-rail 231 and bearing rollers of the roller pairs 154, 454, therefore it is advantageous to utilize the inventive side ramps 237 and 238a or 238b and side rollers 459 and 458 or 348 which provide the desired centering with rolling action rather than wear-producing sliding.

FIGS. 3A, 3B, and 3C illustrate, in various views, a flat skate 340 (compare 140) suitable for use with the rail system 230 of the tire building FMS 100. The flat skate 340 is designed for rolling on the flat rail 232 in the direction indicated by an arrow 341. At a minimum, the flat skate 340 comprises a rigid flat skate body 342 holding at least one flat bearing roller 344. The flat bearing rollers 344 are made of a hard durable material, preferably steel, and include shafts and bushings or preferably roller bearings suitable for bearing the weight load imposed on them while maintaining a roller radius with a precision compatible with the overall system requirements for the precision alignment of the tire building drum 120. In the illustrated embodiment, there are three flat bearing rollers 344 (344a, 344b, 344c) to suitably divide up the weight load on the flat skate 340. The flat skate body 342 is partly cut away behind the rear-most flat bearing rollers 344c to allow clearance for rolling down the flat rail exit ramp 236. A front roller 346 is provided for rolling up the flat rail entry ramp 234 and the flat skate body 342 is suitably partly cut away in front of the front roller 346. The front roller 346 is preferably wider than the flat bearing rollers 344, and also is mounted at a height Hf slightly less than the mounting height Hr of the flat bearing rollers 344. The extra width assures that the front roller 346 will accommodate normally occurring misalignment of the flat skate 340 and the flat rail 232 by engaging with the top surface 292 of the flat rail entry ramp 234 while the side ramps 237 and 238a or 238b funnel the skate 340 laterally to center the flat bearing rollers 344 on the flat rail 232. While being funneled, the front roller 346 may be caused to slide laterally, thereby possibly causing uneven wearing of the front roller 346 rolling surface, therefore the lesser mounting height Hf is employed to prevent the front roller 346 from bearing weight when the flat skate 340 is rolling on the horizontal flat upper surface 292 of the flat rail 232. Also illustrated for this embodiment of the flat skate 340 is a vertical side roller 348 protruding from the outside edge of the leading end of the flat skate 340 and suitable for rolling against the optional side ramp 238b. The flat skate body 342 is suitably partly cut away around the outward portion of the side roller 348.

FIGS. 4A, 4B, 4C, 4D, and 4E illustrate, in various views, a V-skate 450 (compare 150) suitable for use with the rail system 230 of the tire building FMS 100. The V-skate 450 is designed for rolling on the V-rail 231 in the direction indicated by an arrow 451. At a minimum, the V-skate 450 comprises a rigid V-skate body 452 holding at least one V-mounted bearing roller pair 454 comprising two bearing rollers 453/455 which are V-mounted with their rolling surfaces at equal angles θ with respect to the vertical (see FIG. 4D), wherein the angle θ is substantially the same as the angle θ of the two side upper surfaces 291 of the inverted V-shape of the V-rail 232 (see FIG. 2F). The V-mounted bearing rollers 453/455 are made of a hard durable material, preferably steel, and include shafts and bushings or preferably roller bearings suitable for bearing the weight load imposed on them while maintaining a roller radius with a precision compatible with the overall system requirements for the precision alignment of the tire building drum 120. In the illustrated embodiment, there are two V-mounted bearing roller pairs 454 (454a, 454b) to suitably divide up the weight load on the V-skate 450, each V-mounted bearing roller pair 454 comprising two bearing rollers 453/455 (453a/455a, 453b/455b). A flat rear roller 457 is provided for rolling down the flat truncated vertex upper surface 293 of the V-rail exit ramp 235 and the V-skate body 452 is suitably partly cut away behind the rear roller 457. A front roller 456 is provided for rolling up the flat truncated vertex upper surface of the V-rail entry ramp 233 and the V-skate body 452 is suitably partly cut away in front of the front roller 456. The front roller 456 is preferably wide enough to assure that the front roller 456 will accommodate normally occurring misalignment of the V-skate 450 and the V-rail 231 by engaging with the flat truncated vertex upper surface 293 of the V-rail entry ramp 233 while the side ramps 237 and 238a or 238b funnel the skate 450 laterally to center the V-mounted bearing roller pairs 454 on the V-rail 231. With reference to FIGS. 4B and 4D, the rear roller 457 is mounted at a height Hf determined so that when the V-mounted bearing roller pairs 454 are riding on the V-rail 231 (shown with dashed outline in FIG. 4D), then only the V-mounted bearing roller pairs 454 and not the rear roller 457 touch the V-rail 231 after the V-skate 450 has finished entering the rail system 230, i.e., there is a nonzero clearance C between the rear roller 457 and the flat truncated vertex upper surface 293 of the V-rail 231 which surface is at a relative height Hrv. With reference to FIGS. 4B and 4E, the front roller 456 is mounted at a height Hf' (possibly equal to Hf) determined so that when the V-mounted bearing roller pairs 454 are riding on the V-rail 231 (shown with dashed outline in FIG. 4E), then only the V-mounted bearing roller pairs 454 and not the front roller 456 touch the V-rail 231 until the V-skate 450 is exiting the rail system 230, i.e., there is a nonzero clearance C' (possibly equal to C) between the front roller 456 and the flat truncated vertex upper surface 293 of the V-rail 231 which surface is at a relative height Hrv. Also illustrated for this embodiment of the V-skate 450 is a vertical side roller 459 protruding from the outside edge of the leading end of the V-skate 450 and suitable for rolling against the side ramp 237; and a side roller 458 protruding from the inside edge of the leading end of the V-skate 450 and suitable for rolling against the optional side ramp 238a. The V-skate body 452 is suitably partly cut away around the outward portion of the side rollers 458, 459.

As described hereinabove, two alternative funneling methods may be employed according to the invention: a preferred method using side ramps 237 and 238a with corresponding side rollers 459 and 458, respectively; and an alternative method using side ramps 237 and 238b with corresponding side rollers 459 and 348, respectively. Of course it may be convenient to make a single design of flat skate 340 with a flat skate body 342 which enables installation of the side roller 348 as shown in FIG. 3A, and a single design of V-skate 450 with a V-skate body 452 which enables installation of both of the side rollers 458 and 459 as shown in FIG. 4A. These skate designs then allow the user to determine which funneling method is employed by simply mounting the appropriate side ramps 237 and 238a or 237 and 238b. Whichever of the side rollers 348 and 458 are not needed could be left unmounted, as a cost savings.

A detailed description has been presented for apparatus which enables a method for precision alignment of a moving tire building drum 120 to a working axis 111 of an automated tire building system (FMS) 100, wherein the illustrated embodiment of the automated tire building system 100 comprises four work stations 110 with application drums 112 aligned to the working axis 111, and the tire building drum 120 is moved into and out of each work station 110. The method for precision alignment utilizes a rigid two-sided drum support frame 122 having, under one side of the drum support frame 122, one or more flat skates 140, 340 comprising precision roller skates having a total of at least one flat bearing roller 144, 344; and, under the other side of the drum support frame 122, having one or more V-skates 150, 450 comprising precision roller skates having a total of at least two pairs 154, 454 of V-mounted bearing rollers 453/455; and utilizing a rail system 130, 230 comprising first and second approximately parallel rails passing through the work stations 110, wherein the first rail is a flat rail 132, 232 which is substantially flat-topped, and the second rail is a V-rail 131, 231 which is substantially inverted V-shaped on top. The method positions the drum support frame 122, the flat skates 140, 340, and the V-skates 150, 450 relative to the tire building drum 120, the flat rail 132, 232 and the V-rail 131, 231; and positions the flat rail 132, 232 and the V-rail 131, 231 relative to the working axis 111; such that when the flat skates 140, 340 ride on the flat rail 132, 232, and the V-skates 150, 450 ride on the V-rail 131, 231, the tire building drum 120 is precision aligned to the working axis 111, i.e., the axis of rotation 121 of the tire building drum 120 is precision aligned to the working axis 111 of the work stations 110 of the automated tire building system (FMS) 100.

The inventive method includes causing the one or more flat skates 140, 340 to ride on the flat rail 132, 232, and causing the one or more V-skates 150, 450 to ride on the V-rail 131, 231 at least when the tire building drum 120 is in a work station 110. When not in a work station 110, the tire building drum 120 may be moved along an arbitrary path such as the oval path determined by the guide wire 104, and does not have to be riding on a rail system 130, 230, so the method further comprises causing the tire building drum 120 to enter a precision aligned state from a non-aligned state, and also comprises causing the tire building drum 120 to exit from a precision aligned state to a non-aligned state. To enable entering into a precision aligned state from a non-aligned state, a flat rail entry ramp 134, 234 is provided at the entry end of the flat rail 132, 232; a V-rail entry ramp 133, 233 is provided at the entry end of the V-rail 131, 231; gradually up-sloping flat upper surfaces 293, 292 and funneling side ramps 237 and 238a or 238b are provided for the entry ramps 134, 234, 133, 233; flat front rollers 346, 456 and vertical side rollers 459 and 458 or 348 are provided on the skates 140, 340, 150, 450; and a flexible connection 126/127 is provided between the drum support frame 122 and the AGV 102. Additionally, to enable exiting from a precision aligned state to a non-aligned state, a flat rail exit ramp 136, 236 is provided at the exit end of the flat rail 132, 232; a V-rail exit ramp 135, 235 is provided at the exit end of the V-rail 131, 231; gradually down-sloping flat upper surfaces 293, 292 are provided on the exit ramps 136, 236, 135, 235; and flat rear rollers 344c, 457 are provided on the skates 140, 340, 150, 450.

In a preferred embodiment of the tire building FMS system 100, the work stations 110 are aligned to and spaced along a common, linear working axis 111 so that the rail system 130, 230 can comprise a single pair of rails 131, 231, 132, 232; a single pair of entry ramps 133, 233, 134, 234; and a single pair of exit ramps 135, 235, 136, 236. Thus the inventive method, utilizing the preferred embodiment of equipment as described hereinabove, includes the following functionality. The tire building drum 120, moved by the AGV 102 rests atop the AGV 102 until the leading skates 140, 340, 150, 450 begin to enter the entry ramps 134, 234, 133, 233 before the first work station 110a. As the AGV 102 continues forward (following the path of the guide wire 104), the side rollers 459 and 458 or 348 interact with the funneling side ramps 237 and 238a or 238b to cause lateral movement of the tire building drum 120 as needed for lateral alignment of the leading V-skate 150, 450 with the V-rail 131, 231; and the flat front rollers 346, 456 roll up the gradually up-sloping flat upper surfaces 292, 293 to cause a raising of the leading end of the tire building drum 120 as needed to enable vertical alignment of the tire building drum 120 by supporting the tire building drum 120 on the precision aligned rail system 130, 230 instead of on the AGV 102. When the front rollers 346, 456 leave the entry ramps 134, 234, 133, 233, the front rollers 346, 456 will continue to bear weight, rolling on the flat upper surfaces 292, 293 of the rails 132, 232, 131, 231, until the bearing rollers 144, 344, 154, 454 contact the bearing surfaces 292, 291 and cause a further raising of the leading end of the tire building drum 120 so that the bearing rollers 144, 344, 154, 454 of the leading skates 140, 340, 150, 450 are riding on the rail system 130, 230. As the AGV 102 continues forward (following the path of the guide wire 104), the entry process is repeated for the trailing skates 140, 340, 150, 450 so that, once the trailing skates 140, 340, 150, 450 have passed through the entry ramps 134, 234, 133, 233 and the bearing rollers 144, 344, 154, 454 of the trailing skates 140, 340, 150, 450 are riding on the bearing surfaces 292, 291 of the rail system 130, 230, then the entire tire building drum 120 (and drum support frame 122) is raised off of the AGV 102 to ride on the precision aligned rail system 130, 230 with the axis of rotation 121 of the tire building drum 120 precision aligned vertically and horizontally with the working axis 111 of the automated tire building system 100 work stations 110. After the AGV 102 has moved the tire building drum 120 through all of the work stations 110, the leading skates 140, 340, 150, 450, followed by the trailing skates 140, 340, 150, 450, will exit the precision aligned rail system 130, 230 via the exit ramps 136, 236, 135, 235. As the last V-mounted bearing roller pair 454b enters the V-rail exit ramp 135, 235 it will roll down the gradually down-sloped bearing surface 291 of the V-rail exit ramp 135, 235 until the rear roller 457 begins to ride on the flat upper surface 293 of the V-rail 131, 231, after which the V-skate rear roller 457 and the flat skate rear-most roller 344c will together control the gradual lowering of the tire building drum 120 as they roll down the gradually down-sloped flat surfaces 293, 292 of the exit ramps 135, 235, 136, 236. After the trailing skates 140, 340, 150, 450 have exited the exit ramps, the drum support frame 122 (and the tire building drum 120) will be lowered to the point where it is resting entirely on the AGV 102.

Although the AGV 102 has been utilized in the described embodiment of the invention as a preferred way of moving the tire building drum 120 through the FMS 100, it should be understood that any means of propulsion could be utilized which allows the tire building drum 120, held by the drum support frame 122 to ride on skates 140, 340, 150, 450 and rails 132, 232, 131, 231 which provide precision alignment of the tire building drum 120 with the working axis 111 of a work station 110 of a tire building system 100 according to the invention as described herein. Therefore all such means of propulsion should be considered to be within the scope of the present invention.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A method for aligning a plurality of tire building drums with a plurality of work stations of an automated tire building system, comprising:
   independently moving each tire building drum with a self-propelled vehicle traveling on a rail system having two parallel rails to the plurality of work stations;
   supporting and vertically aligning each tire building drum with at least one of the parallel rails at each of the work stations; and
   laterally aligning each tire building drum with only one of the parallel rails at each of the work stations; and
further comprising:
   providing entry ramps on the rail system for raising the tire building drum off of the vehicle in order to ride on the rail system through the plurality of work stations; and
   providing exit ramps on the rail system for lowering the tire building drum in order to rest on the vehicle instead of riding on the rail system while not moving through the plurality of work stations.

2. The method of claim 1, further comprising the step of:
   laterally funneling the tire building drum into the rail system at the entry ramps.

3. The method of claim 1, further comprising the step of:
   providing flat rollers attached to the tire building drum to ride up the entry ramps and to ride down the exit ramps.

4. A method for aligning three or more tire building drums moving through three or more work stations of an automated tire building system, the method comprising the step of:
   independently moving each tire building drum through the three or more work stations so that an axis of revolution of each tire building drum is coincident with a working axis extending through the three or more work stations;
   further comprising the steps of:
   providing a rail system of two approximately parallel rails extending parallel to the working axis through the three or more work stations; and causing each tire building drum to ride on the rail system through the three or more work stations;
   further comprising the steps of:
   independently moving each tire building drum with a self-propelled vehicle traveling along the rail system; and
   flexibly attaching each tire building drum to a one of the vehicles;
   further comprising the steps of:
   resting the tire building drum on the vehicle for moving the tire building drum to and from the rail system;
   providing entry ramps on the rail system for raising the tire building drum off of the vehicle in order to ride on the rail system through the three or more work stations; and
   providing exit ramps on the rail system for lowering the tire building drum in order to rest on the vehicle instead of riding on the rail system while not moving through the three or more work stations.

5. The method of claim 4, further comprising the step of:
   laterally funneling the tire building drum into the rail system at the entry ramps.

6. The method of claim 4, further comprising the step of:
   providing flat rollers attached to the tire building drum to ride up the entry ramps and to ride down the exit ramps.

7. The method of claim 4, further comprising the step of:
   positioning the three or more work stations to be aligned to and spaced along a common, linear working axis.

8. The method of claim 4, further comprising the steps of:
   using both of the approximately parallel rails for supporting and vertically aligning each tire building drum as it rides through the three or more work stations; and
   using one of the approximately parallel rails for laterally aligning each tire building drum as it rides through the three or more work stations.

9. The method of claim 8, further comprising the steps of:
   providing a substantially flat top on a first rail of the two approximately parallel rails; and
   providing a substantially inverted V-shaped top on a second rail of the two approximately parallel rails.

10. The method of claim 9, further comprising the steps of:
    providing at least one flat roller attached to each tire building drum to ride on the first rail; and
    providing at least two pairs of V-mounted rollers attached to each tire building drum to ride on the second rail.

* * * * *